US008519311B2

(12) United States Patent
Paice

(10) Patent No.: US 8,519,311 B2
(45) Date of Patent: Aug. 27, 2013

(54) TIMBER TREATMENT USING RADIO FREQUENCY ENERGY

(75) Inventor: Christopher Roy Paice, Auckland (NZ)

(73) Assignee: A. J. Park, Auckland (NZ)

( * ) Notice: Subject to any disclaimer, the term of this patent is extended or adjusted under 35 U.S.C. 154(b) by 591 days.

(21) Appl. No.: 12/672,882

(22) PCT Filed: Aug. 8, 2008

(86) PCT No.: PCT/NZ2008/000204
§ 371 (c)(1),
(2), (4) Date: Apr. 12, 2010

(87) PCT Pub. No.: WO2009/022919
PCT Pub. Date: Feb. 19, 2009

(65) Prior Publication Data

US 2010/0236088 A1 Sep. 23, 2010

(30) Foreign Application Priority Data

Aug. 10, 2007 (NZ) ........................................ 560590

(51) Int. Cl.
*H05B 6/64* (2006.01)
*A23L 3/00* (2006.01)

(52) U.S. Cl.
USPC ............................ 219/773; 219/771; 426/237

(58) Field of Classification Search
USPC . 219/773, 771, 778, 779, 780; 426/238-243, 426/237; 427/131; 324/664
See application file for complete search history.

(56) References Cited

U.S. PATENT DOCUMENTS

| | | | | |
|---|---|---|---|---|
| 4,258,240 | A | 3/1981 | Pless | |
| 4,629,851 | A | 12/1986 | Holle | |
| 4,638,571 | A * | 1/1987 | Cook | 34/255 |
| 6,303,166 | B1 | 10/2001 | Kolbe et al. | |
| 6,657,173 | B2 * | 12/2003 | Flugstad et al. | 219/771 |

FOREIGN PATENT DOCUMENTS

| | | |
|---|---|---|
| GB | 763079 | 12/1956 |
| GB | 977995 | 12/1964 |
| GB | 2159613 | 12/1985 |

* cited by examiner

*Primary Examiner* — Quang Van
(74) *Attorney, Agent, or Firm* — Hovey Williams LLP

(57) ABSTRACT

An RF timber drying apparatus includes a pair of capacitor plates within the chamber and spaced from each other across the chamber such that a timber load can be contained into the chamber between the capacitor plates, a resonator circuit, and an RF generating circuit with adjustable power output for adjusting the voltage output from the RF generator to compensate for changes in moisture content as the timber dries.

15 Claims, 1 Drawing Sheet

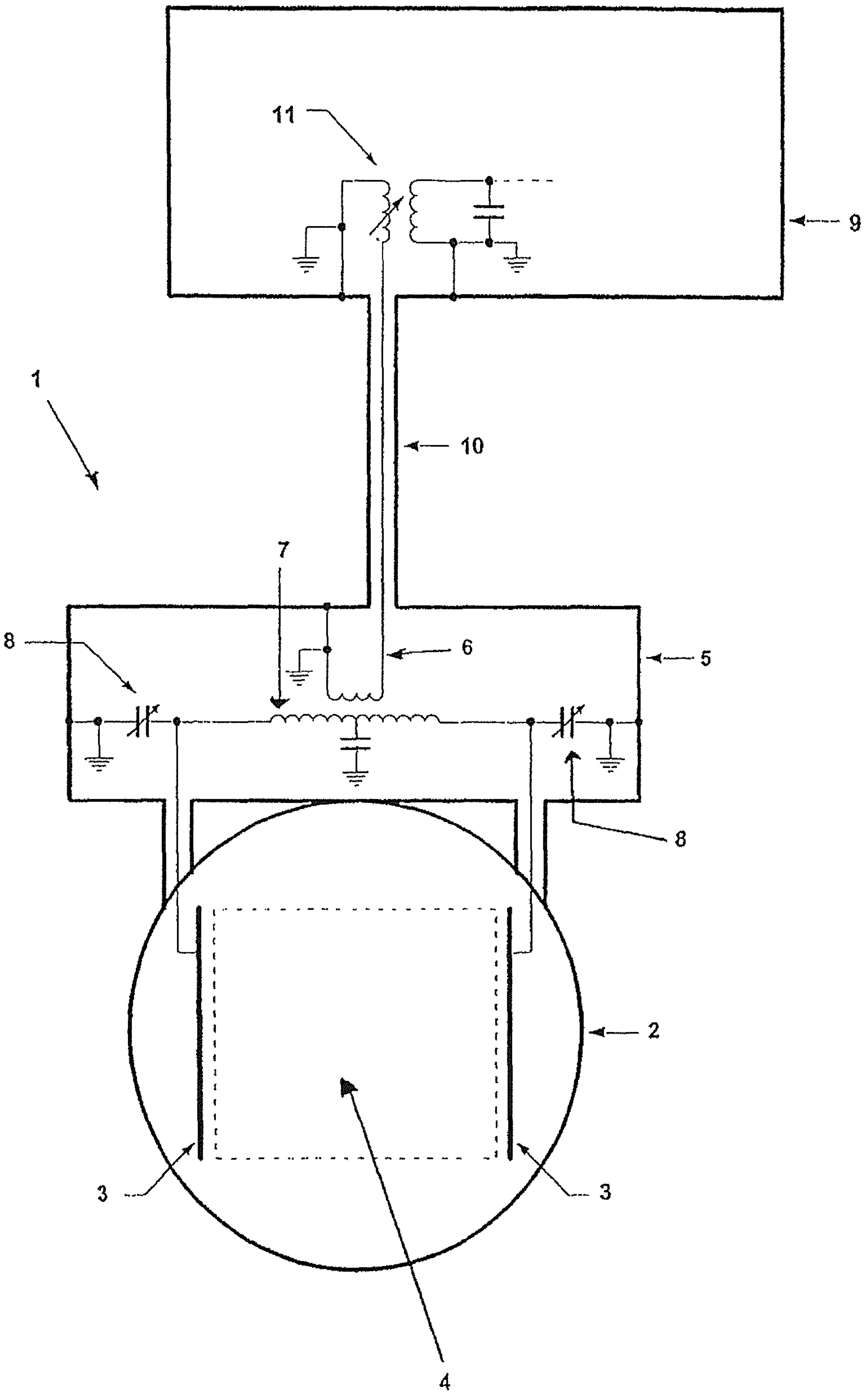
11
9
1
10
7
8
6
5
8
2
3
3
4

TIMBER TREATMENT USING RADIO FREQUENCY ENERGY

FIELD OF THE INVENTION

The invention relates to an improved system and method of drying timber, and in particular, although not exclusively, to a system and method for treating timber down to a low moisture content using radio frequency (RF) energy.

BACKGROUND TO THE INVENTION

RF drying can be used for example to dry green i.e. freshly cut wood, from high moisture content down to approaching 12% moisture content RF drying relies on the inherent properties of water within the green timber to absorb the RF energy. The water molecules are bipolar and switch polarity as the radio frequency wave passes through the water within the timber. The "switching" action of the water molecules heats the water. The resultant heat energy transfers itself through the structure of the timber thereby heating the body of the timber causing a diffusion of moisture within the timber to the surface of the timber for evaporation.

Typically RF timber drying requires a considerable amount of 'setting up' before the drying process can commence. When a filleted timber stack is placed in the kiln, capacitor plates are interleaved between layers of the filleted timber stack load before each capacitor plate is connected to an RF generator to commence the RF drying process. Placing capacitor plates between layers of timber is required to ensure that sufficient RF energy penetrates all of the timber. This system works well when the timber has a high moisture content and the resultant 'load' is large due to the large amount of moisture present in the timber and the relatively high dielectric loss factor of water. However, as the timber dries out the load decreases and the amount of RF power being delivered into the load becomes more difficult to control.

There is a need for a method and system for RF drying timber that reduces equipment set-up when a load of timber is placed in a drying chamber and/or is operable such that the RF power being delivered into the load is more controllable while the timber load is drying.

It is an object of the present invention to provide an improved RF timber drying system and method, or at least to provide the industry or the public with the useful choice.

SUMMARY OF THE INVENTION

In a first aspect, the invention may broadly be said to consist in a timber drying apparatus for drying timber comprising a chamber having at least one opening through which said processed timber to be dried is inserted, a pair of capacitor plates located opposite each other and positioned within said chamber such that they are positioned in close proximity to a timber load inserted within said chamber, a resonator circuit electrically connected to each of said pair of capacitor plates, an RF generating circuit electrically connected to said resonator circuit and used to generate a voltage at a frequency for output to said resonator circuit and provided with an adjustable power output device for adjusting said voltage output from said RF generator to compensate for changes in said moisture content of said processed timber as said processed timber dries.

Preferably, said resonator circuit is a series resonant circuit.

Preferably, said series resonant circuit includes a variable capacitor connected in series with each end of an inductor coil and a transfer coil used to transfer a voltage generated by said RF generator to said inductor coil.

Preferably, said variable capacitors are adjusted such that said inductor coil resonates at a resonance frequency.

Preferably, said inductor coil has a high Q-factor.

Preferably, said series resonant circuit multiplies said voltage input from said RF generator circuit by said Q-factor.

Preferably, each of said variable capacitors are hinged on one side of said variable capacitor to provide a means of adjusting said resonance frequency of said resonant circuit.

Alternatively, each of said variable capacitors are vacuum capacitors to provide a means of adjusting said resonance frequency of said resonant circuit.

Preferably, said pair of capacitor plates are vertically oriented and located on either side of said timber load within said chamber.

Alternatively, said pair of capacitor plates are horizontally oriented and located above and below of said timber load within said chamber.

Preferably, said RF generator circuit adjustable power output device is manually controlled.

Alternatively, said RF generator circuit adjustable power output device is automatically controlled by a microcontroller used to control the operation of said timber drying apparatus.

Preferably, said timber drying apparatus also includes a sensor used to sense said moisture content in said timber load and provide a feedback of said moisture content to a timber processing operator.

Alternatively, said timber drying apparatus also includes a sensor used to sense said moisture content in said timber load and provide feedback to said microcontroller to automatically adjust the RF generator circuit power output in response to changes in said moisture content of said processed timber.

Preferably, said moisture content is between 10 to 20% before being inserted into said timber drying apparatus.

Alternatively, said moisture content is between 10 to 16% before being inserted into said timber drying apparatus.

Alternatively, said moisture content is between 12 to 14% before being inserted into said timber drying apparatus.

In a second aspect, the invention may broadly be said to consist in a timber drying apparatus comprising:

a chamber having at least one opening through which timber load to be dried is inserted, a pair of capacitor plates located opposite each other and positioned within said chamber such that they are positioned in close proximity to said timber load inserted within said chamber, an RF generating circuit electrically connected to said pair of capacitor plates and used to generate a voltage at a frequency for output to said pair of capacitor plates, an inductor electrically connected between said pair of capacitor plates having an impedance that matches that of said RF generator circuit, said RF generator being provided with an adjustable power output device operable to adjust said voltage output from said RF generator to compensate for changes in said moisture content of said timber load as said timber load dries.

Preferably, said pair of capacitor plates are vertically oriented and located on either side of said timber load within said chamber.

Alternatively, said pair of capacitor plates are horizontally oriented and located above and below of said timber load within said chamber.

Preferably, said RF generator circuit adjustable power output device is manually controlled.

Alternatively, said RF generator circuit adjustable power output device is automatically controlled by a microcontroller used to control the operation of said timber drying apparatus.

Preferably, said timber drying apparatus also includes a sensor used to sense said moisture content in said timber load and provide a feedback of said moisture content to a timber processing operator.

Alternatively, said timber drying apparatus also includes a sensor used to sense said moisture content in said timber load and provide feedback to said microcontroller to automatically adjust the RF generator circuit power output in response to changes in said moisture content of said processed timber.

Preferably, said moisture content is between 10 to 20% before being inserted into said timber drying apparatus.

Alternatively, said moisture content is between 10 to 16% before being inserted into said timber drying apparatus.

Alternatively, said moisture content is between 12 to 14% before being inserted into said timber drying apparatus.

In a third aspect, the invention may broadly be said to consist in a method of decreasing the moisture content of a timber load using radio frequency energy comprising the steps of:

loading said timber load between a pair of capacitor plates located within a chamber, closing said chamber to enclose said timber load within said chamber, generating a voltage from an RF generator for output to a series resonant circuit electrically connected to said RF generator, adjusting said series resonant circuit until said series resonant circuit generates a peak voltage signal output at a resonance frequency, applying said peak voltage signal output to said pair of capacitor plates electrically connected to said series resonant circuit to generate a voltage between said pair of capacitor plates at a resonant frequency, and adjusting said voltage generated by said RF generator to compensate for a change in said moisture content of said timber load.

The term "comprising" as used in the specification means "consisting at least in part of", that is to say when interpreting statements in this invention which include that term, the features prefaced by that term in each statement, or need to be present but other features can also be present.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

The invention consists in the foregoing and also envisages construction of which the following give examples.

BRIEF DESCRIPTION OF THE DRAWINGS

A preferred form of the present invention will now be described by way of example only and with reference to the accompanying drawing which is an electrical block diagram of the timber drying apparatus.

DESCRIPTION OF THE PREFERRED EMBODIMENT OF THE INVENTION

The RF timber drying apparatus 1 of the preferred embodiment of the invention can be used to decrease the moisture content of a timber load down to below 20%, typically to a moisture content in the range of 8 to 15%, and more preferably to about 12%. The invention can be employed to remove moisture naturally present in green wood, or to remove moisture and/or solvents present in timber for example after preservation with light organic solvent preservative (LOSP) treatment or similar timber treatment processing.

A timber processing chamber or kiln 2 has a pair of capacitor plates 3 that are preferably vertically oriented, and are opposite each other on either side of and within the timber processing chamber 2. The plates 3 may alternatively be horizontally oriented opposite each other on the top and bottom of the processing chamber 2. The capacitor plates 3 can be moved in and out to be closer to or further away from one another to accommodate different sizes of timber load between the capacitor plates 3. The capacitor plates 3 remain within the timber chamber 2, and can easily be moved apart to accommodate loading of timber loads. Timber load 4 refers to a load of timber including, but not limited to, one or more logs, one or more blocks of timber, timber that has been cut into lengths, and timber that has been cut to lengths and placed into a filleted stack of timber.

A resonator box 5 is located in close proximity to and preferably on top of the processing chamber 2. The output of the resonator box 5 is connected in series with each of the capacitor plates 3. The resonator box 5 houses a transfer coil 6 and balance series resonant circuit including an inductor coil 7 having a variable capacitor 8 connected in series with the output of each side of the inductor 7. The variable capacitors 8 are hinged at one end and are used to 'tune' the inductive circuit to provide the desired resonant frequency output. Alternatively, circuit trimming can be achieved by using variable vacuum capacitors 8. Variable vacuum capacitors may provide a greater range of trimming of the inductive circuit. The resonating circuit provides a balanced voltage output for driving the capacitor plates 3. Hence, one of the capacitor plates 3 will be at a positive potential while the opposite capacitive plate 3 has a negative potential and visa versa as the capacitor plates 3 swing between positive and negative voltages. Thus an alternating a voltage is provided across and between the timber load 4 to be dried that is located between the capacitor plates 3.

An RF generator 9 is electrically connected to the resonator box 5, via a shielded conductor 10 with inductive coupling from the RF generator tank coil 11 and the resonator box coil 6. The coupling from the RF generator tank coil 11 is variable and used to control the amount of power being provided by the RF generator 9 for input to the resonator box 5. This power feed presents a low resistance to RF and so that the length of the conductor 10 is less critical compared with conventional coaxial feeds that commonly feed high impedance plates in RF heating timber systems.

As only capacitor plates 3 are used on either side of the timber load 4 rather than interleaving a number of capacitor plates 3 between the layers of timber 4, the voltage required to heat the water within the timber 4 will be in the order of several tens of kilovolts. Using a resonator box 5 including a series resonant circuit provides a means of multiplying the voltage provided from the RF generator 9, since at resonance the driving voltage is multiplied by the Q-factor of the resonant circuit that appears across both the inductive and capacitive components of the circuit. Therefore, the voltage generated across the capacitor plates 3 is substantially independent of the RF generator 9. Furthermore, the voltage generated is sufficiently large enough to undertake the timber drying process by ensuring the inductor within the resonator box 5 has a high 'Q' factor.

As the moisture content of the timber stack 4 decreases as a result of the RF drying process, the loading on the resonating circuitry will change. In order to monitor the changes in moisture content and ultimately changes in the 'load' it is preferable that a sensor(s) such as one or more temperature sensors are used to sense temperature changes within the timber load 4. Feedback from the sensor(s) can then be used by an individual operating the timber drying apparatus to manually adjust the power being output from the RF generator. Alternatively, the entire process can be automated by interfacing the RF generator to a programmable logic controller (PLC). The PLC may be programmed with a number of temperature profiles that are used to compare with actual temperature feedback provided by one or more temperature sensors inserted into or located in close proximity to the timber 4 being dried. Therefore, as the moisture content of the timber load 4 changes, the power output from the RF generator is automatically adjusted to compensate for circuit loading changes.

In an alternative configuration, the capacitor plates 3 may be connected directly to the RF generator of the preferred embodiment using co-axial cables. An inductor is then interconnected between the capacitor plates 3 to match the impedance of the RF generator. This eliminates the need to trim the inductor using variable hinged or vacuum capacitors 8.

Existing RF heating systems used in the timber industry generally require the transfer or feed of the reactive, component of power [kVAR] which often requires the feed to carry up to 10 times more power than the present invention. By comparison, as the RF heating configuration of the invention provides for the coupling of two resonant circuits (RF generator to the load) whereby only the 'real' power [kW] is being transferred to the timber 4.

The invention therefore provides an RF timber heating system using a resonant circuit to provide the required field strength and generate a high voltage. A balanced high voltage is applied across two opposing capacitor plates 3 to generate RF energy used to heat and dry a timber load 4 located between the capacitor plates 3 without having to interleave the capacitor plates 3 between the layers of a timber load 4.

The foregoing describes the invention including a preferred form thereof. Alterations and modifications as would be obvious to those skilled in the art are intended to be incorporated within the scope hereof as described in the accompanying claims.

The invention claimed is:

1. A timber drying apparatus for drying timber comprising:

a chamber having at least one opening through which timber to be dried can be loaded into the chamber, at least a pair of capacitor plates within the chamber and spaced from each other across the chamber such that a timber load can be contained in said chamber between the capacitor plates, with the capacitor plates positioned in close proximity to the timber load, an RF generating circuit including an adjustable power output device for adjusting a voltage output from said RF generating circuit to compensate for changes in moisture content of a timber load as it dries; and an inductor electrically connected to each of the capacitor plates to form a resonator circuit, the resonator circuit being arranged to resonate with the timber load and to multiply the voltage output of the RF generating circuit by a Q-factor of the inductor to dry the timber load, wherein the resonator circuit is a series resonant circuit that includes a first variable capacitor connected in series with a first end of the inductor, a second variable capacitor connected in series with a second end of the inductor, and a transfer coil connected to transfer a voltage generated by said RF generating circuit in the inductor such that the inductor resonates at a resonance frequency.

2. A timber drying apparatus according to claim 1 wherein each of said first and second variable capacitors are hinged one side to enable adjustment of capacitance for adjusting said resonance frequency of said resonant circuit.

3. A timber drying apparatus according to claim 2 wherein each of said first and second variable capacitors are vacuum capacitors enabling adjustment of capacitance for adjusting resonance frequency of said resonant circuit.

4. A timber drying apparatus according to claim 1 wherein said pair of capacitor plates are vertically oriented and are transversely spaced from each other across the interior of said chamber.

5. A timber drying apparatus according to claim 1 wherein said capacitor plates are horizontally oriented and are vertically spaced from each other within said chamber.

6. A timber drying apparatus according to claim 1 wherein the RF generating circuit adjustable power output device is arranged to be automatically controlled by an electronic microcontroller of said timber drying apparatus.

7. A timber drying apparatus according to claim 1 also including a sensor arranged to sense and display to an operator an indication of moisture content in a timber load.

8. A timber drying apparatus according to claim 7 also including a sensor arranged to sense and provide to said microcontroller an indication of moisture content in said timber load, said microcontroller being arranged to automatically adjust the RF generating circuit power output in response to changes in moisture content in said timber load.

9. A timber drying apparatus comprising:

a chamber having at least one opening through which timber to be dried can be loaded into the chamber, at least a pair of capacitor plates within the chamber and spaced from each other across said chamber such that the timber load can be contained between the capacitor plates with the capacitor plates in close proximity to said timber load, an RF generating circuit electrically connected to said pair of capacitor plates and arranged to generate a voltage at a frequency for output to said pair of capacitor plates, an inductor electrically connected between said pair of capacitor plates to form a resonator circuit, the inductor having an impedance that matches that of said RF generator circuit, said RF generator being provided with an adjustable power output device operable to adjust said voltage output from said RF generator to compensate for changes in a timber load as it dries, the resonator circuit being arranged to resonate with the timber load and to multiply the voltage output of the RF generating circuit by a Q-factor of the inductor to dry the timber load, wherein the resonator circuit is a series resonant circuit that includes a first variable capacitor connected in series with a first end of the inductor, a second variable capacitor connected in series with a second end of the inductor, and a transfer coil connected to transfer a voltage generated by said RF generating circuit in the inductor such that the inductor resonates at a resonance frequency.

10. A timber drying apparatus according to claim 9 in which capacitance is variable for adjusting resonance frequency of said resonator circuit.

11. A timber drying apparatus according to claim 9 wherein said pair of capacitor plates are vertically oriented and are transversely spaced from each other across the interior of said chamber.

12. A timber drying apparatus according to claim 9 wherein said pair of capacitor plates are horizontally oriented and are vertically spaced from each other within said chamber.

13. A timber drying apparatus according to claim 9 wherein said RF generating circuit adjustable power output device is arranged to be automatically controlled by an electronic microcontroller of said timber drying apparatus.

14. A timber drying apparatus according to claim 9 also including a sensor arranged to sense and display to an operator an indication of moisture content in a timber load.

15. A timber drying apparatus according to claim 13 also including a sensor arranged to sense and provide to said microcontroller an indication of moisture content in said timber load, said microcontroller being arranged to automatically adjust the RF generating circuit power output in response to changes in moisture content in said timber load.

* * * * *

UNITED STATES PATENT AND TRADEMARK OFFICE

CERTIFICATE OF CORRECTION

PATENT NO. : 8,519,311 B2
APPLICATION NO. : 12/672882
DATED : August 27, 2013
INVENTOR(S) : Paice It is certified that error appears in the above-identified patent and that said Letters Patent is hereby corrected as shown below:

On the title page item [73] should read “Crusader Engineering Limited, Auckland (NZ) and High Frequency International Limited, Auckland (NZ)”.

Signed and Sealed this
Fourth Day of March, 2014

Michelle K. Lee
*Deputy Director of the United States Patent and Trademark Office*